US012131618B2

(12) United States Patent
Kusens

(10) Patent No.: US 12,131,618 B2
(45) Date of Patent: Oct. 29, 2024

(54) LOCATION AWARE ALERTING AND NOTIFICATION ESCALATION SYSTEM AND METHOD

(71) Applicant: COLLATERAL OPPORTUNITIES, LLC, Wilmington, DE (US)

(72) Inventor: Michael Kusens, Southwest Ranches, FL (US)

(73) Assignee: COLLATERAL OPPORTUNITIES, LLC, Willmington, DE (US)

( * ) Notice: Subject to any disclaimer, the term of this patent is extended or adjusted under 35 U.S.C. 154(b) by 0 days.

(21) Appl. No.: 17/988,577

(22) Filed: Nov. 16, 2022

(65) Prior Publication Data

US 2023/0071718 A1 Mar. 9, 2023

Related U.S. Application Data

(63) Continuation of application No. 17/062,930, filed on Oct. 5, 2020, now Pat. No. 11,508,231, which is a (Continued)

(51) Int. Cl.
*G08B 25/00* (2006.01)
*G08B 27/00* (2006.01)

(52) U.S. Cl.
CPC ........... *G08B 25/006* (2013.01); *G08B 25/00* (2013.01); *G08B 27/00* (2013.01)

(58) Field of Classification Search
CPC ...... G08B 21/00; G08B 21/04; G08B 21/043; G08B 21/0446; G08B 25/00; G08B 27/00;

(Continued)

(56) References Cited

U.S. PATENT DOCUMENTS

2013/0040600 A1* 2/2013 Reitnour ........... H04M 1/72424 455/418
2013/0143519 A1* 6/2013 Doezema ............... A61B 5/681 455/404.2

(Continued)

OTHER PUBLICATIONS

NPL Search (Dec. 19, 2023).*

*Primary Examiner* — Van T Trieu
(74) *Attorney, Agent, or Firm* — DANIEL S. POLLEY, P.A.

(57) ABSTRACT

A system and method for electronic notification of a person(s) in proximity to a given location at the time assistance is needed. A networked system of wireless radio, sound and/or light-based beacons are provided for communicating with a person's smartphone, computer system, or other electronic device. Wireless radio, sound and/or light-based beacons selectively broadcast a configurable data set within a given area of the beacon. The strength of the signal can vary depending on the alert type, time to respond requirements and specific characteristics of the location that would affect the time to respond. Software running on the person's smartphone, computer system, tablet or other electronic device preferably receives the signal(s) broadcast by the wireless radio, sound and/or light-based beacons and decoding the data set broadcast. Depending on the configuration of the system, the decoded data set can cause the software to provide an alert to the person, which can include, but is not limited to, the location and type of alert. The alert may take the form of a visual message on the display of the person's smartphone, computer system, or other electronic device, an audible alert, vibration, and/or other available alerting mechanism on the person's smartphone, computer system or other electronic device.

18 Claims, 9 Drawing Sheets

Related U.S. Application Data continuation of application No. 16/161,173, filed on Oct. 16, 2018, now Pat. No. 10,796,559, which is a continuation of application No. 15/406,717, filed on Jan. 14, 2017, now Pat. No. 10,109,179.

(60) Provisional application No. 62/279,015, filed on Jan. 15, 2016.

(58) Field of Classification Search
CPC ......... H04W 4/00; H04W 4/02; H04W 4/021; H04W 4/025; H04W 4/06; H04W 4/22; H04H 60/90; H04L 12/28; H04N 7/18
See application file for complete search history.

(56) References Cited

U.S. PATENT DOCUMENTS

| | | | | |
|---|---|---|---|---|
| 2013/0217332 | A1* | 8/2013 | Altman | G06Q 20/3224<br>455/3.01 |
| 2014/0218517 | A1* | 8/2014 | Kim | H04L 12/2836<br>348/143 |

* cited by examiner

LOCATION AWARE ALERTING AND NOTIFICATION ESCALATION SYSTEM AND METHOD

This application is a continuation of U.S. application Ser. No. 17/062,930, filed Oct. 5, 2020, now U.S. Pat. No. 11,508,231, which is a continuation of U.S. application Ser. No. 16/161,173, filed Oct. 16, 2018, now U.S. Pat. No. 10,796,559, which is a continuation of U.S. application Ser. No. 15/406,717, filed Jan. 14, 2017, now U.S. Pat. No. 10,109,179, which claims the benefit of and priority to U.S. Provisional Patent Application Ser. No. 62/279,015, filed Jan. 15, 2016. All applications are incorporated by reference in their entireties for all purposes.

BACKGROUND

A number of situations exist where a person is in need of assistance and such assistance must either be rendered within a specific time frame in order to ensure the safety of said person and/or is best rendered by available persons within range of the person in need. For a non-limiting example, an individual being assaulted; an individual suffering a medical emergency (heart attack, stroke, seizure, etc.), a hotel, restaurant or bar customer wanting service; or a person(s) observed by someone else (security guard, video monitor, law enforcement, etc.) in need of urgent attention. In these instances where time to respond to the need is of the utmost importance, it is critical to inform those in close enough proximity to the person in need of said need so that the response can hopefully be made in sufficient time to satisfy the need.

SUMMARY OF THE DISCLOSURE

A system and method are described that allows for the electronic notification of a person(s) in proximity to a given location at the time assistance is needed. The disclosed method preferably can work through a networked system of wireless radio, sound and/or light-based beacons communicating with a person's smartphone, computer system, or other electronic device. Wireless radio, sound and/or light-based beacons selectively broadcast a configurable data set within a given area of the beacon. For example, the signal strength can be configured to either restrict the range of the signal by lowering the power or increasing the range of the signal by increasing the signal strength. The strength of the signal can vary depending on the alert type, time to respond requirements and specific characteristics of the location that would affect the time to respond. Software running on the person's smartphone, computer system, tablet or other electronic device preferably receives the signal(s) broadcast by the wireless radio, sound and/or light-based beacons and decoding the data set broadcast. Depending on the configuration of the system, the decoded data set can cause the software to provide an alert to the person, which can include, but is not limited to, the location and type of alert. The alert may take the form of a visual message on the display of the person's smartphone, computer system, or other electronic device; an audible alert; vibration; and/or other available alerting mechanism on the person's smartphone, computer system, or other electronic device.

All person's smartphone, computer system, tablet or other electronic device which receive an alert automatically register themselves as a potential alert responder in a notification escalation system database for any given alert that they receive. This registration can be in the form of an electronic communication (TCP/IP), SMS, MMS, Email or other electronic form of communication. The person's smartphone, computer system, tablet or other electronic device will preferably display buttons to allow for accepting or rejecting the alert though the use of gestures, voice control, motion, or other input mechanisms previously programmed to be recognized by the system. When a person accepts an alert, an electronic communication (TCP/IP), SMS, MIMS, Email or other electronic form of communication can be sent to the notification escalation system which in turn notifies all other potential alert responders for that particular alert that the alert has been accepted. Alert rejections can be registered in the notification escalation system via an electronic communication (TCP/IP), SMS, MMS, Email or other electronic form of communication. Additional components and escalation rules can be similarly configured including, but not limited to, minimum and maximum number of acceptances per alert, maximum time to respond to an alert, alert escalation method and/or resource.

The following non-limiting definitions are provided as an aid in understanding at least certain embodiments for the disclosed novel method and system.

| | |
|---|---|
| Central Monitoring & Alert Generation System Database | An electronic database where alert types, messages, proximities, locations, power levels, broadcast duration and time to respond are managed and stored. |
| Central Monitoring & Alert Generation System | A specially programmed and/or configured electronic or computer system which allows for the configuration and generation of alert messages which are sent to various alert broadcasting, receiving and display devices. Alerts may be manually generated by a user of the system and/or the system can be automatically configured/programmed to send/generate an alert upon the tripping of a sensor, receipt of an alert generation request or other automated and electronic means of alert triggering. |
| Personal Communication Device Alert Application "App" | A specially designed software application "App" that is installed on the user's electronic system or device and which allows for the reception, processing and management of alert message signals. |
| Alert System App Database | An electronic database where alert types, notification methods, and other alert message information is stored and can be queried by the Personal Communication Device for interpretation and processing of alert message signals. Preferably, the database is stored on the Personal Communication Device where the App is installed and can be in one non-limiting embodiment a table indicating what the alert(s) stand for, i.e. "alert code 1 equals an x type of alert while alert code 2 equals a y type of alert", etc. |

-continued

| | |
|---|---|
| Personal Communication Device | A computer system or electronic device including but not limited to cell phone, smartphone, key card, tablet, laptop or other computer system belonging to and/or carried/possessed by a user that is specially programmed with the App to permit communication with one or more alert broadcasting, receiving and display devices. |
| Wireless Radio, Sound and/or Light-based Beacon | A small receiver/transmitter capable of operating on short and/or long range wireless communication between electronic devices. Capabilities include, but are not limited to, pinpointing its own location, being programmed, configured or designed to utilize the software in a smart phone, cellular phone or other electronic device to determine that device's location and bi-directional data transmission.<br>Wireless radio, sound and/or light-based beacons can utilize technologies including, but not limited to, Near Field Communication (NFC), Bluetooth, GPS, WiFi, Light-Fidelity (LiFi), Magnetic, Ultrasound, InfraRed (IR), and Radio Frequency (RF). All of these technologies and similar current or similar later developed communication technologies are included in the term "wireless radio" wherever that term appears in this disclosure.<br>Beacons can be integrated into a mobile alert broadcasting, receiving and display device or be separate devices. When integrated into the mobile device the beacon can act to both determine its location relative to other beacons or via GPS (as non-limiting examples) as well as broadcast a beacon signal with an alert message that any nearby cell phone (electronic device) having the App installed and running can pickup. |
| Alert Broadcasting, Receiving & Display Device | A smartphone, cellular phone, computer, tablet, laptop or any electronic device with wireless radio, sound and/or light-based beacon communication capability and specifically programmed to receive alert commands from the central monitoring and alert generation system and transmit corresponding alert message signals. Thus, the system does not need to track or record the locations of the personal communications devices, as the devices merely need to be close enough to the location where assistance is needed in order to receive the alert signal. |
| Notification Escalation System | A specially programmed or configured electronic or computer system which allows for the receipt and transmission of alert recipient registrations and alert recipient responses and can be configured to allow monitoring of the time to respond, the minimum and maximum number of accepted alert responses, and notification of other systems when escalation is necessary. |
| Notification Escalation System Database | An electronic database where the notification escalation system parameters are stored and can be queried for use by the Notification Escalation System. Non-limiting examples of the data stored in the database include alert recipient groups, alert response times, escalation procedures, alert responder minimum and limits. |
| Location Interface System | A specially programmed or configured electronic or computer system which allows for real-time location information of the alert broadcasting, receiving and display device to be passed to the central monitoring and alert generation system to be included in alert command messages. |
| Device Location Database | An electronic database where the location parameters and information (GPS Coordinates, Address, Building, Room or other location identification type) of each Alert Broadcasting, Receiving and display device can be stored and made available for querying. As an optional, but not necessary feature, a database can be provided that captures the registration information for each personal communication device. Rather, for function of the system and method, each personal communication device is independent and only needs to have the App running on it to receive the alert signals. If the system configures alert signal a to broadcast at a power level equal to 100 foot radius and then alert signal b is configured to a power level equal to a 500 foot radius then, only personal communication devices within those ranges would receive each type of alert. |

DETAILED DESCRIPTION

Figure 1:
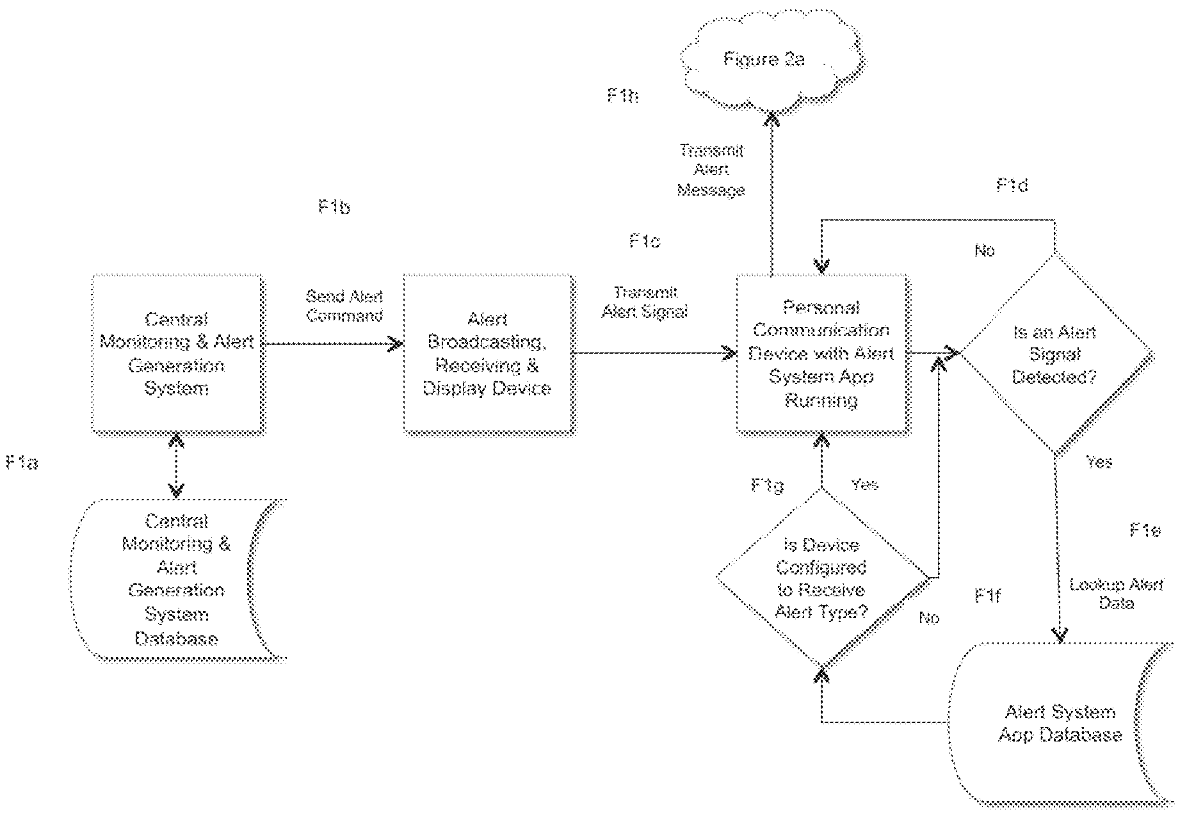
FIG. 1 is a block diagram and process flow illustrating a non-limiting embodiment for an alert generation and reception system and process in accordance with the present disclosure.

FIG. 1 shows one non-limiting system and method embodiment for generating an alert signal using a central monitoring and alert generation system and receiving the alert on a person's smartphone, computer system, tablet or other electronic device. The alert signal can be decoded and presented to the person before transmitting an alert message to the notification escalation system. The use of the notification escalation system is not necessary to the performance of all aspects of this disclosure. The personal communication device having the App running on it can be the device that preferably decodes the alert signal. In one non-limiting embodiment, decoding is meant to refer to looking up the alert type in the App database and then displaying the description of that alert on the personal communication device. In one embodiment, the system can use BLE beacon technology. With this technology, each alert signal can contain a UUID, Major and Minor Value. The UUID will identify that it is an alert signal beacon, the major value the type of alert in numerical form (1-65535) and the minor value a location code, again numerical (1-65535). If an alert signal is sent with a UUID of 41242353205, major of 11111 and minor of 22222, as a non-limiting example, that decoded may mean a heart attack is happening in room 1234. To enhance security of the system and prevent spoofing of alert signals, a one-time password algorithm may be incorporated into the alert signal through the UUID, Major and/or Minor values. As a non-limiting example, the one-time password algorithm can use a shared secret key in an algorithm that is known by the central monitoring & alert generation system; alert broadcasting, receiving and display device as well as the personal communication device with alert system app. When an alert signal is sent, it is encoded with a one-time password as part of the alert message. The alert reception app decodes and validates the alert signal against the same one-time password algorithm and secret key to ensure it was sent from an approved device. Known one-time password algorithms such as the Time-based One-time Password Algorithm (TOTP) and HMAC-based One-time Password Algorithm (HOTP) may be utilized though it is not considered limiting and any one-time password technology now known or later developed can be substituted and/or used.

At Fla, a central monitoring and alert generation system is in communication with a central monitoring & alert generation system database and can be programmed/configured with a series of configurations including, but not limited to, alert types, messages, proximities, locations, power levels, broadcast duration and/or time to respond. As a non-limiting example, an alert for a heart attack may have a configured broadcast power level equivalent to 2500 square foot in distance from the location of the person in need and a 5 minute duration, while an alert for a person who has simply fallen and needs assistance getting up may have a configured broadcast level equivalent to 10,000 square feet in distance from the location of the person in need and a 30 minute duration due to the urgent nature of the heart attack requiring a quicker response time.

At F1*b*, a user at the central monitoring and alert generation system selects an alert command to be sent to one or more alert broadcasting, receiving and display devices. Alternatively, the alert command can be automatically sent from central monitoring and alert generation system (without human intervention) to the one or more alert broadcasting, receiving and display devices due to the tripping of a sensor, receipt of an alert generation request or other automated and electronic means of alert triggering. As non-limiting examples, a motion detection sensor can be configured to send an electronic alert notification to the central monitoring and alert generation system when it detects motion in a given area or a heart rate monitoring band can send an alert notification to the central monitoring and alert generation system when it detects a sudden drop in a person's heart rate, and the central monitoring and alert generation system can be programmed/configured to automatically generate and transmit the alert command based on the information it receives from the motion detection sensor, heart rate monitoring band, etc.

At F1*c*, the alert broadcasting, receiving and display device(s) that received the alert command electronically reads the contents of the alert command and broadcasts an alert signal with the customized transmission power, message, location and/or other configured data sets. As a non-limiting example, customization can be a Power Level of −9DB for transmissions, UUID of 124124325u8, Major Value of 11111 and Minor value of 22222. The power level dictates how far the signal is broadcast, the UUID identified it as an alert signal, the major value the type of alert and the minor value the location. These can be configured/customized from the central monitoring system. The alert signal is transmitted for a configurable amount of time before transmission ceases. As a non-limiting example, an alert signal for a heart attack may transmit for 8 minutes and then cease to transmit as the beneficial time to respond would have been exceeded.

At Fld, personal communication device(s) with the alert system software/App installed and within the transmission range of the alert signal are constantly scanning for a broadcast alert signal. The scanning period can be configured within the software to scan at varying intervals depending on the specific use case and power consumption requirements/limitations of the devices. If an alert signal is not detected, the scanning can continue. The software/App on the Personal communication device can be customized/configured such that the device only scans for certain types of alerts, such as where the owner only wants to respond to certain types of alerts. As a non-limiting example, a personal communication device can be set to only pick up message signals with UUID 123214245 and Major values or 11111, 22222, and 33333. In this example, if an alert signal is sent with a Major value of 44444 it is ignored by the App on the personal communication device. Preferably, the scanning occurs in a low power mode so as not to significantly affect the battery life of the Personal Communication Device performing the scanning.

At F1*e*, once the personal communication device(s) with the alert system software/App installed detects an alert signal being broadcasted in its proximity, it can automatically query the alert system application database to determine the alerting parameters of the received signal.

At Flf, the personal communication device(s) with the alert system software/App installed determines if it is configured to display or act upon the alert type received. If the device is not configured to display or act upon the specific alert type, it can be configured/programed to continue scanning for alert signals.

At Flg, if the personal communication device(s) with the alert system software installed is configured to receive the alert type received, the alert is rendered on the personal communication device(s). The alert may take the form of a visual message on the display of the person's smartphone, computer system, tablet or other electronic device; an audible alert; vibration; and/or other available alerting mechanism on the person's smartphone, computer system, or other electronic device subject to the configured parameters of the system. Depending on the configuration of the system, the alert can provide information such as the type of alert and identity or location of the alerting device if so configured. Though not required, the system and/or Personal Communication Device can be customized or configured for different audible alerts depending on the alert type it receives. Where vibration alerts are provided, unique vibration patterns could be used for each type of alert. Though again not required, the audible alerts and vibration patterns can be customized or configured to be different from standard audible alerts and vibration patterns that the smartphone normally comes with, so that the user can distinguish from an alert generated through the present system and method and typical alerts associated with the phone, such as, but not limited to, incoming phone calls, incoming email, incoming text messages, etc.

Figure 2:
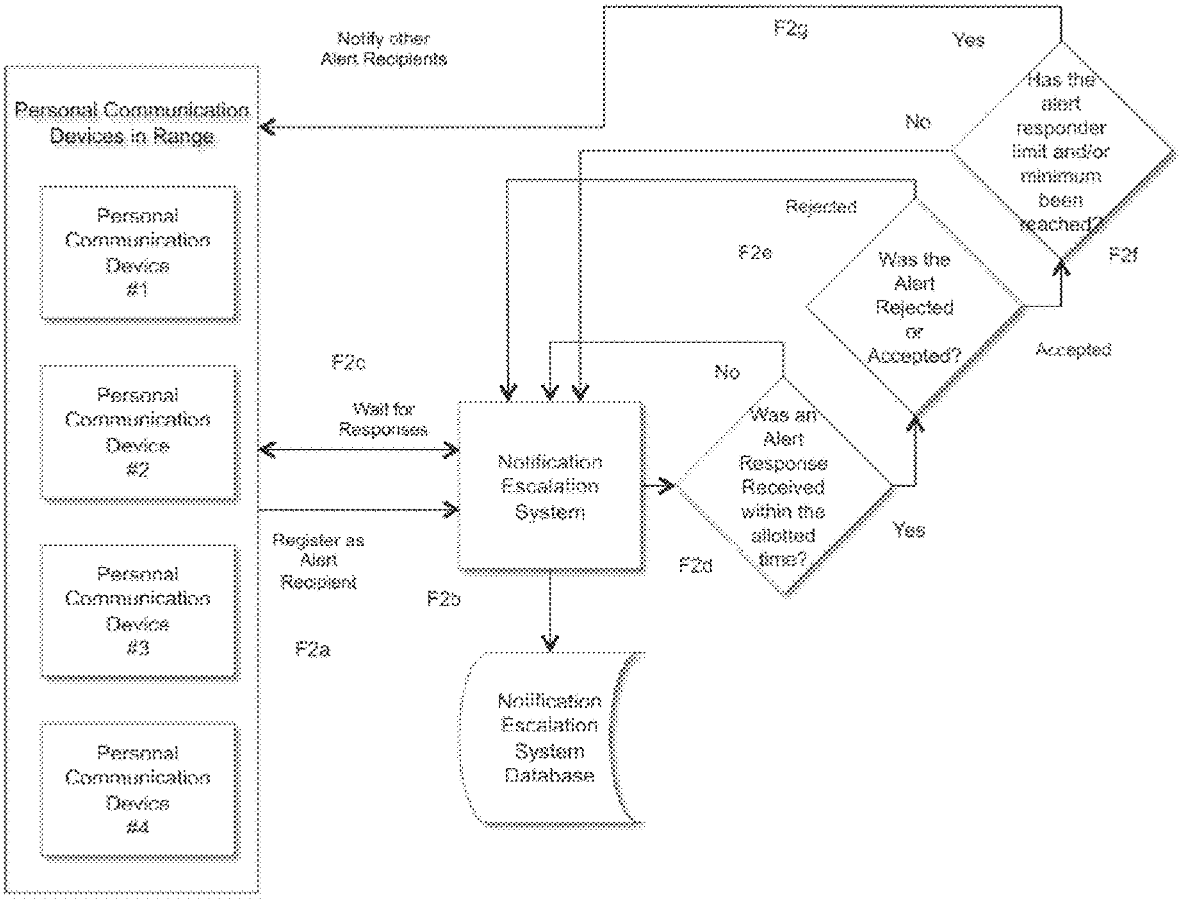
FIG. 2 is a block diagram and process flow illustrating a non-limiting embodiment for an alert notification escalation process in accordance with the present disclosure.

At F1*h*, the personal communication device(s) with the alert system software/App installed transmits an alert message to the Notification Escalation system to register the device as an alert recipient as depicted in FIG. 2. This registration can be in the form of an electronic communication (TCP/IP), SMS, MMS, Email or other electronic form of communication.

FIG. 2 illustrates how an alert recipient is registered with the notification escalation system and how the notification escalation system functions.

At F2*a*, an alert recipient registration message can be sent to the notification escalation system. This registration can be in the form of an electronic communication (TCP/IP), SMS, MMS, Email or other electronic form of communication. Though not limiting, preferably the message is a SMS message, though it can be any type of electronic message. The smartphone (personal communication device) sends a text message to a preprogrammed number when it receives an alert signal which will register it in the responder queue. The user can preferably then see a button saying Accept and Reject on their phone screen. When they hit either one, it sends another text message to the notification escalation system with a message, such as, but not limited to, Accept or Reject. The notification escalation system then moves them to a different queue depending on what response was received. Queue minimums and maximums can be built in. Alternatively, an email, XML, or other electronic file can be sent that has a unique id for the personal communication device.

At F2*b*, the notification escalation system can interpret the data from the alert recipient registration message and stores the alert recipient information in a system database with characteristics to define this group of recipients as alert responders for a given alert. Multiple alert responder groups/queues can be maintained by the notification escalation system at any given time. Here the notification escalation system can receive the SMS message sent in F2*a* and puts the smartphone into a queue.

At F2*c*, once the first alert recipient registration message is received for a given alert, the notification escalation system can automatically begin a timer for this alert recipient group and waits for alert responses from the recipients. Here, the timer on the queue can begin as the alert is escalated to a second group of people or to a second method if an accepted response is not received within a predetermined time period, such as, but not limited to, within 30 seconds, etc.

At F2*d*, if an alert response has not been received within the allotted time to respond, the system can be configured/programmed to execute its escalation process which may include notifications to other parties, systems or the activation of other warning and alerting devices such as sirens, alarms, lights, etc. Once an alert response is received, the system can determine the type of response received and which alert recipient sent the response.

At F2*e*, if the alert response was a rejected type, the notification escalation system can be configured/programmed to continue to wait for responses and repeats the process beginning at F2*c*.

At F2*f*, for an accepted alert response type, the notification escalation system can be configured/programmed to determine if the alert responder minimum or limit has been reached. If the limit and/or minimum number of responders has not been reached, the notification escalation system can be configured/programmed to continue to wait for responses and repeats the process beginning at F2*c*.

At F2*g*, once the alert responder limit and/or minimum has been reached, the notification escalation system can notify the other alert recipients who have yet to respond to the alert.

Figure 3:
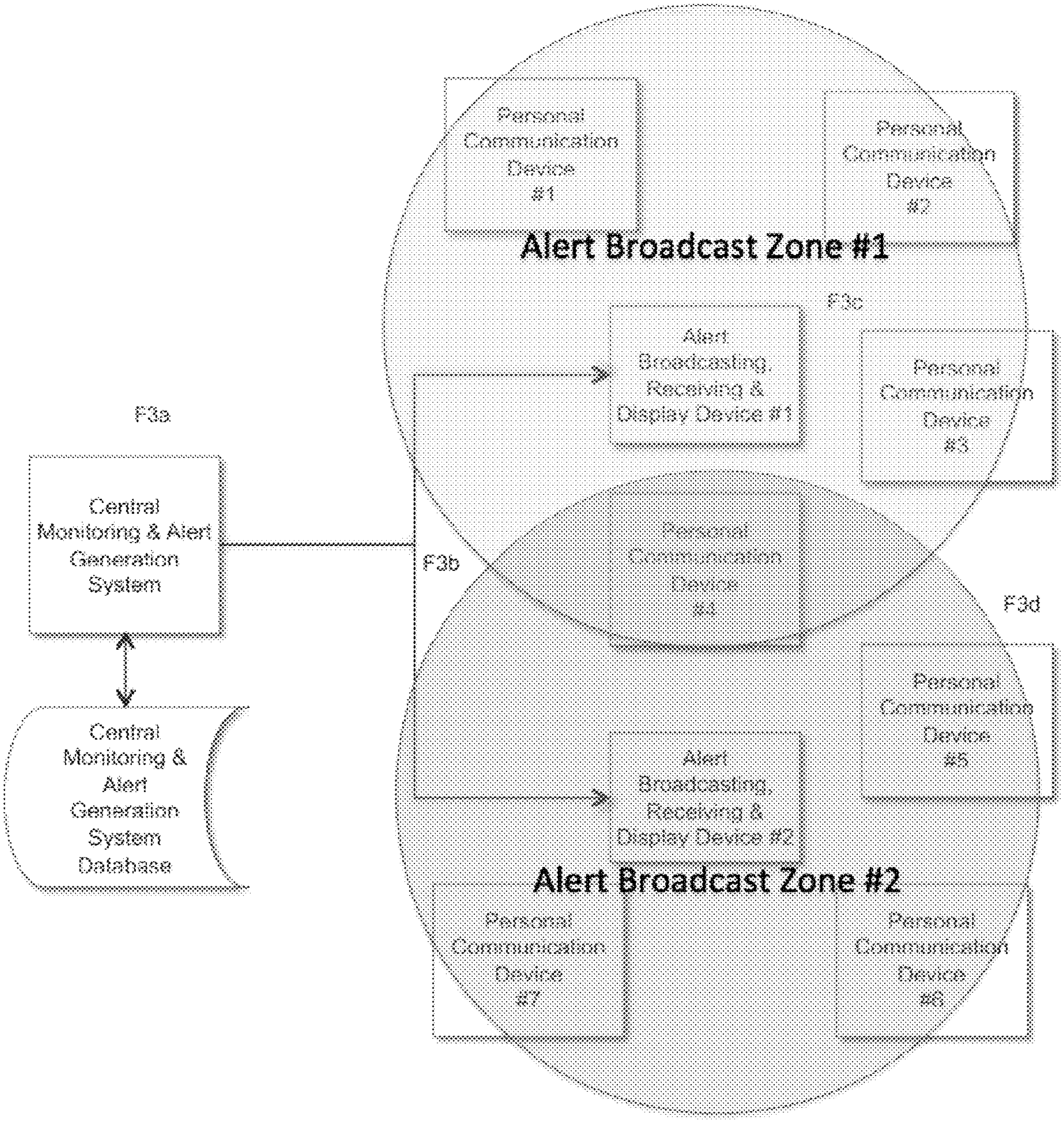
FIG. 3 is a block diagram and process flow illustrating a non-limiting embodiment for alert broadcasting zones and process in accordance with the present disclosure.

FIG. 3 illustrates the broadcasting of alert message signals from multiple alert broadcasting, receiving and display devices to a multitude of personal communication devices.

At F3*a*, a user at the central monitoring and alert generation system selects two different alert commands (for this non-limiting example) to be sent to specific alert broadcasting, receiving and display devices. Alternatively, the alert commands can be automatically sent from the central monitoring and alert generation system to one or more alert broadcasting, receiving and display devices due to the tripping of a sensor, receipt of an alert generation request or other automated and electronic means of alert triggering. Preferably, each alert can stand on its own. As seen in FIG. 3, where the two different and unrelated alerts are sent out or transmitted, preferably only the Personal Communication Devices that are within the broadcast range of each alert will receive the alert. In FIG. 3, only Personal Communication Device #4 will receive both different alerts, while the other Personal Communication Devices receive only one of the alerts.

At F3*b*, the alert command message is received by one or more alert broadcasting, receiving and display devices.

At F3*c*, the alert broadcasting, receiving and display devices process the alert command message and begin to broadcast alert message signals as configured.

At F3*d*, personal communication devices within the proximity of each broadcast signal receive the alert message signal and begin to process the messages as in FIG. 1. In the non-limiting illustration shown in FIG. 3, Personal Communication Device #4 will receive alert message signals from both alert broadcasting, receiving and display devices, while all other personal communication devices illustrated will only receive alert message signals from one of the broadcasting, receiving and display devices.

Figure 4:
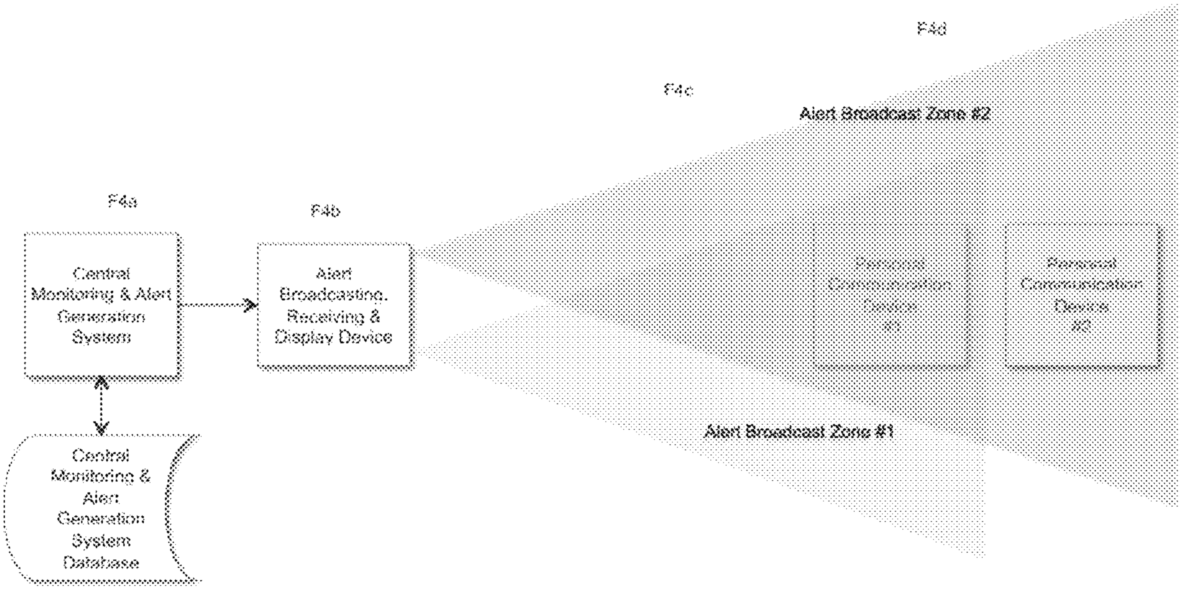
FIG. 4 is a block diagram and process flow illustrating a non-limiting embodiment for an alert broadcasting zone process with varying signal power loads in accordance with the present disclosure.

FIG. 4 illustrates a non-limiting embodiment for broadcasting of alert message signals of varying power levels.

At F4*a*, a user at the central monitoring and alert generation system selects two different alert commands with varying broadcast power levels to be sent to an alert broadcasting, receiving and display device. The broadcast power can be in terms of decibels (dbs) for the Bluetooth beacon signal. As a non-limiting example, the system can broadcast one message at a −15 db power level while another one can be broadcast at a 3 db level. The 3db level signal is relatively much more powerful than the −15 db level signal and therefore the 3 db level signal should travel farther than the −15 db level signal. In one non-limiting embodiment, ultrasonic sound can be sent and measured in terms of volume DB or possibly a volume level on a scale of 1-100. To achieve this in one non-limiting embodiment, a transmit power parameter can be passed from the central monitoring system when generating the alert that the alert broadcasting device receives. The alert broadcasting device can then dynamically modify the alert broadcast signal for that alert to the received parameter passed from the central monitoring system. Alternatively, a specific alert power level for each alert type can be preprogrammed/configured in the alert broadcasting device.

Alternatively, the alert commands can be automatically sent from central monitoring and alert generation system to one or more alert broadcasting, receiving and display devices due to the tripping of a sensor, receipt of an alert generation request or other automated and electronic means of alert triggering.

At F4*b*, the alert command message is received by alert broadcasting, receiving and display devices.

At F4*c*, the alert broadcasting, receiving and display device process the alert command messages and begins to broadcast alert message signals at the configured power levels.

At F4*d*, personal communication devices within the proximity of each broadcast signal receive the alert message signal and begin to process the messages as in FIG. 1. In this non-limiting illustration shown in FIG. 4, the first alert message can be broadcast at a smaller signal power level then the second alert message. As a result, only the personal communication device that is closest to the alert broadcasting, receiving and display device will receive both alert message signals while the one farthest from the alert broadcasting, receiving and display device will only receive the second alert message signal.

Figure 5:
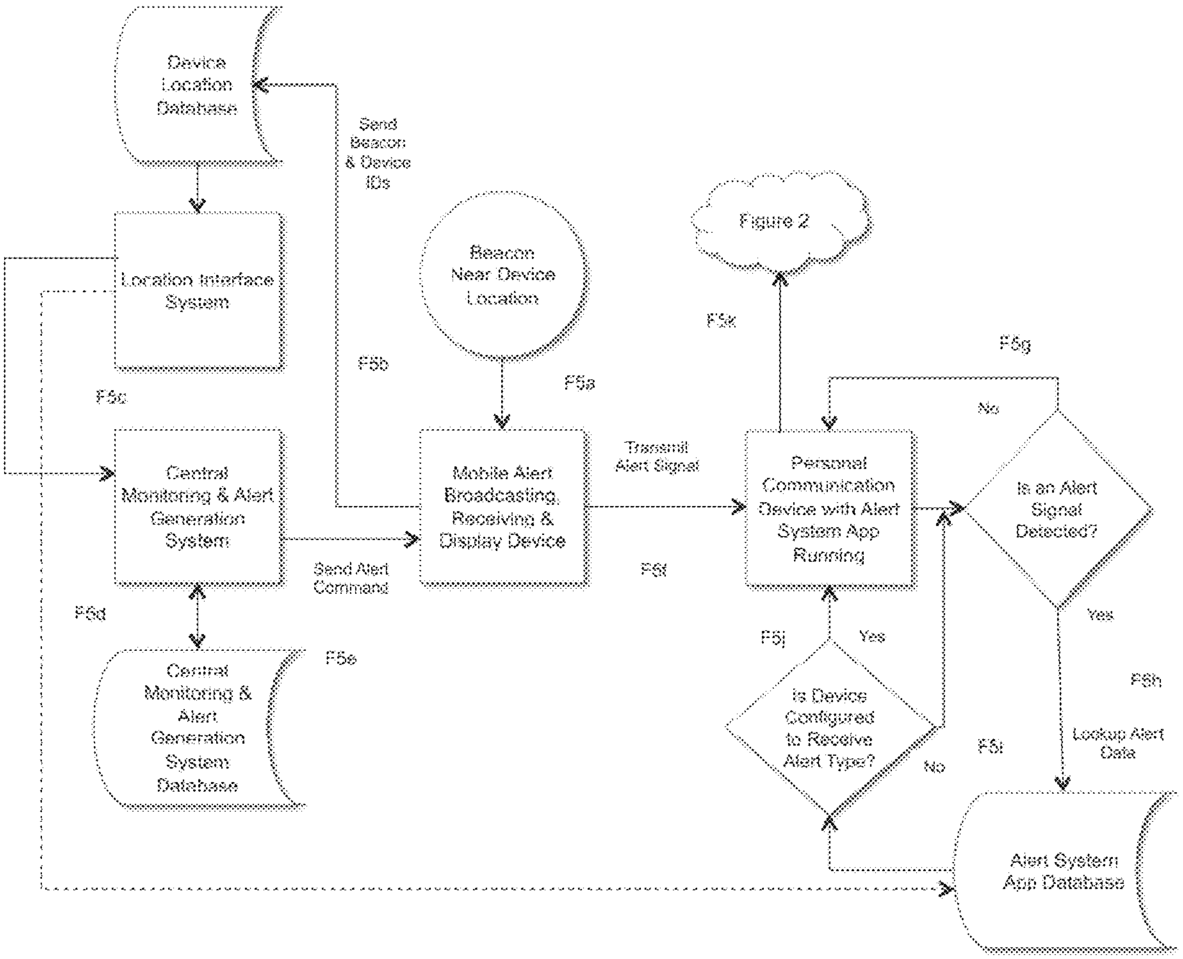
FIG. 5 is a block diagram and process flow illustrating a non-limiting embodiment for an alert generation and reception system process with real-time location in accordance with the present disclosure.

FIG. 5 shows one non-limiting method for generating an alert signal from a central monitoring and alert generation system and receiving it on a person's smartphone, computer system, or other electronic device incorporating real-time location of the device. The alert signal can be decoded as described above and presented to the person before transmitting an alert message to the notification escalation system. The use of the notification escalation system is not necessary or required to the performance of all aspects of this disclosure.

At F5*a*, a wireless radio, sound and/or light-based beacon identifies its location and/or broadcasts its location and identity to mobile alert broadcasting, receiving and display device(s).

At F5*b*, the mobile alert broadcasting, receiving and display device take the location identity and information and sends it to a device location database. The mobile alert broadcasting, receiving and display device may query for new location information at configurable intervals. For mobile devices, when they are moved from one location to another, the device can pick up a new location beacon so that the mobile device is automatically and/or constantly updating its current location.

At F5*c*, upon receipt of new device location data, the location interface system can automatically send updated device location information to the central monitoring & alert generation system and preferably also to the Alert System App database on all personal communication devices with the alert system app installed.

At F5*d*, a central monitoring and alert generation system can be programmed/configured with a series of configurations including, but not limited to, alert types, messages, proximities, locations, power levels, broadcast duration and time to respond. As a non-limiting example, an alert for a heart attack may have a configured broadcast power level equivalent to 2500 square foot in distance and a 5-minute duration while an alert for a person who has simply fallen and needs assistance getting up may have a configured broadcast level equivalent to 10,000 square feet in distance and a 30-minute duration due to the urgent nature of the heart attack requiring a quicker response time.

At F5*e*, a user at the central monitoring and alert generation system can select an alert command to be sent to one or more alert broadcasting, receiving and display devices. Alternatively, the alert command can be automatically sent from central monitoring and alert generation system (without human intervention) to the one or more alert broadcasting, receiving and display devices due to the tripping of a sensor, receipt of an alert generation request or other automated and electronic means of alert triggering. As non-limiting examples, a motion detection sensor can be configured to automatically send an electronic alert notification to the central monitoring and alert generation system when it detects motion in a given area or a heart rate monitoring band can automatically send an alert notification to the central monitoring and alert generation system when it detects a sudden drop in a person's heart rate, and the central monitoring and alert generation system can be programmed/configured to automatically generate and transmit the alert command based on the information it receives from the motion detection sensor, heart rate monitoring band, etc.

At F5*f*, the alert broadcasting, receiving and display device(s) that received the alert command electronically read(s) the contents of the alert command and broadcasts an alert signal with the customized transmission power, message, location and/or other configured data sets. The alert signal is transmitted for a configurable amount of time before transmission ceases. As a non-limiting example, an alert signal for a heart attack may transmit for 8 minutes and then cease to transmit as the beneficial time to respond would have been exceeded.

At F5*g*, personal communication device(s) with the alert system software/App installed and within the transmission range of the alert signal can be constantly scanning for a broadcast alert signal. The scanning period can be configured within the software/App to scan at varying intervals depending on the specific use case and power consumption requirements/limitations of the devices. If an alert signal is not detected, the scanning can continue.

At F5*h*, once the personal communication device(s) with the alert system software/App installed detects an alert signal being broadcasted in its proximity, it can query the alert system application database to determine the alerting parameters of the received signal. Additionally, it can query for the location information for the mobile alert broadcasting, receiving and display device it received the alert message signal from.

At F5*i*, the personal communication device(s) with the alert system software/App installed can determine if it is configured to display or act upon the alert type received. If the device is not configured to display or act upon the specific alert type, it can continue scanning for alert signals.

At F5*j*, if the personal communication device(s) with the alert system software/App installed is configured to receive the alert type received, the alert is rendered on the personal communication device(s). The alert may take the form of a visual message on the display of the person's smartphone, computer system, or other electronic device; an audible alert; vibration; or other available alerting mechanism on the person's smartphone, computer system, tablet or other electronic device subject to the configured parameters of the system. Depending on the configuration of the system, the alert can provide information such as the type of alert and identity or location of the alerting device if so configured.

At F5*k*, the personal communication device(s) with the alert system software/App installed can transmits an alert message to the Notification Escalation system to register the device as an alert recipient as depicted in FIG. 2. This registration can be in the form of an electronic communication (TCP/IP), SMS, MIMS, Email or other electronic form of communication.

Figure 6:
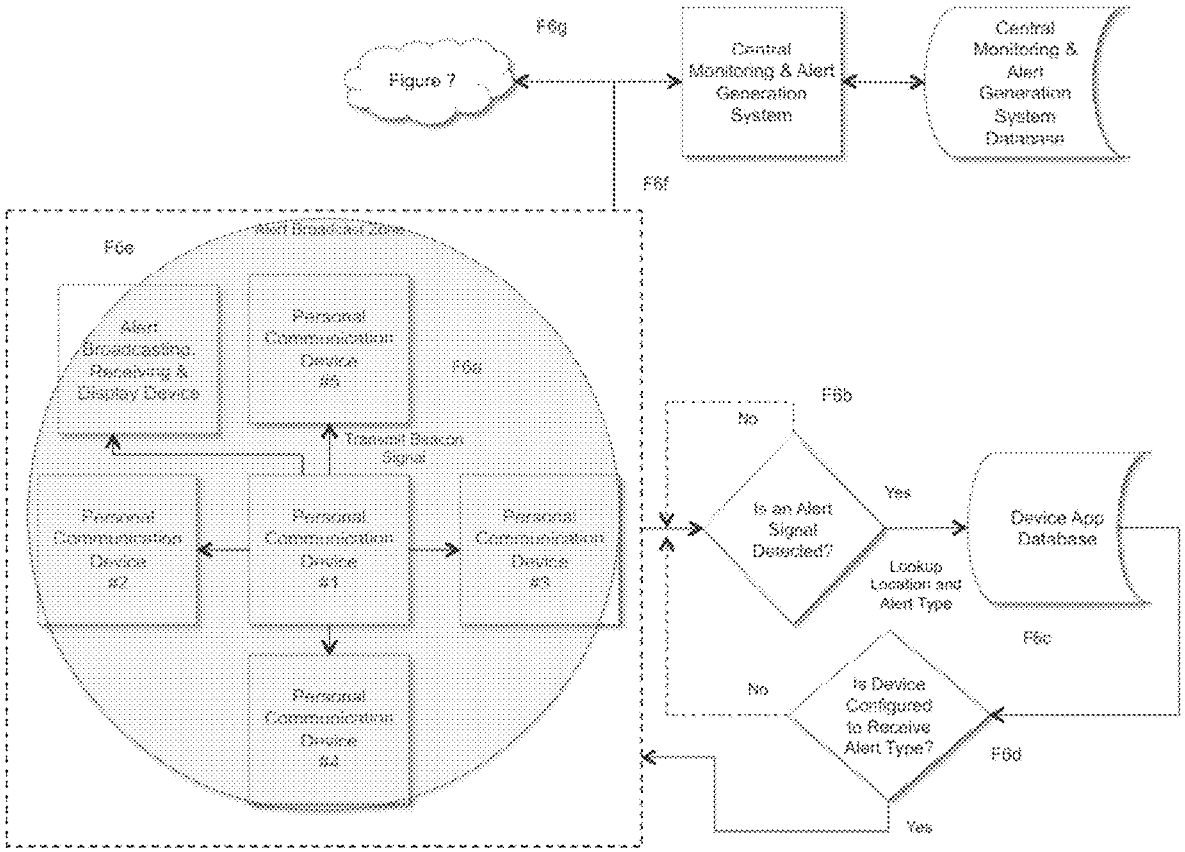
FIG. 6 is a block diagram and process flow illustrating a non-limiting embodiment for a device to device alerting system and process in accordance with the present disclosure.

FIG. 6 demonstrates a personal communication device, with the alert system app installed, can function as an alert generation device as well to alert nearby persons of a need.

At F6*a*, a person having a personal communication device with the alert system app installed (Personal Communication Device #1 in the illustration) can select an alert message signal to be broadcast within its own vicinity. Alternatively, the alert message signal can be automatically generated due to the tripping of a sensor, receipt of an alert generation request or other automated and electronic means of alert triggering. As non-limiting examples, a heart rate monitoring band in communication with or integrated to the personal communication device can send an alert message signal when it detects a sudden drop in a person's heart rate. The alert message signal can be transmitted for a configurable amount of time before transmission ceases. As a non-limiting example, an alert signal for a heart attack may transmit for 8 minutes and then cease to transmit as the beneficial time to respond would have been exceeded.

At Fhb, personal communication device(s) and/or alert broadcasting, receiving and display device(s) with the alert system software/App installed and within the transmission range of the alert message signal can be constantly scanning for a broadcast alert signal. The scanning period can be configured within the software to scan at varying intervals depending on the specific use case and power consumption requirements/limitations of the devices. If an alert signal is not detected, the scanning continues.

At F6*c*, once the personal communication device(s) and/or alert broadcasting, receiving and display device(s) with the alert system software installed detect(s) an alert signal being broadcast in its proximity, it can query the alert system application database to determine the alerting parameters of the received signal. Additionally, it can query for the location information for the mobile alert broadcasting, receiving and display device it received the alert message signal from.

At F6*d*, the personal communication device(s) and/or alert broadcasting, receiving and display device(s) with the alert system software installed determines if it is configured to display or act upon the alert type received. If the device is not configured to display or act upon the specific alert type, it can continue scanning for alert signals.

At F6*e*, if the personal communication device(s) and/or alert broadcasting, receiving and display device(s) with the alert system software installed is configured to receive the alert type received, the alert can be rendered on the personal communication device(s). Said alert may take the form of a visual message on the display of the person's smartphone, computer system, tablet or other electronic device; an audible alert; vibration; and/or other available alerting mechanism on the person's smartphone, computer system, or other electronic device subject to the configured parameters of the system. Depending on the configuration of the system, the alert can provide information such as the type of alert and identity or location of the alerting device if so configured.

At F6*f*, the personal communication device(s) and/or alert broadcasting, receiving and display device(s) with the alert system software/App installed, and which received the alert message signal, can send a notification to the central monitoring and alert generation system to notify the user of the alert and make a record in the system database.

Figure 7:
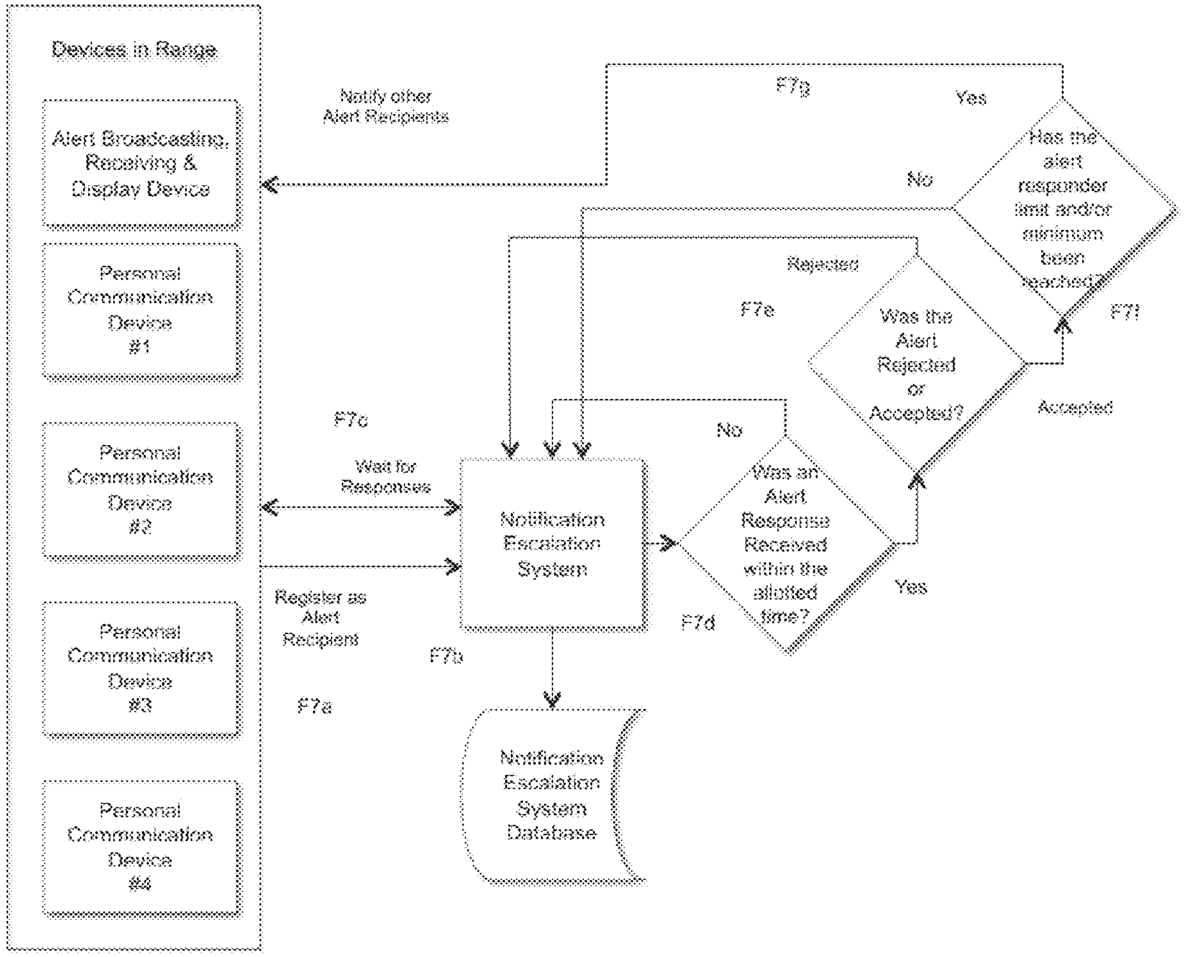
FIG. 7 is a block diagram and process flow illustrating a non-limiting embodiment for a device to device alert notification escalation system and process in accordance with the present disclosure.

At F6*g*, the personal communication device(s) and/or alert Broadcasting, receiving and display device(s) with the alert system software/App installed can transmit an alert message to the Notification Escalation system to register the device as an alert recipient as depicted in FIG. 7. This registration can be in the form of an electronic communication (TCP/IP), SMS, MMS, Email or other electronic form of communication.

FIG. 7 illustrates how an alert recipient is registered with a notification escalation system in a device to device alert situation and how the notification escalation system functions.

At Fla, an alert recipient registration message can be sent to the notification escalation system by personal communication device(s) and alert broadcasting, receiving and display device(s). This registration can be in the form of an electronic communication (TCP/IP), SMS, MIMS, Email or other electronic form of communication. Though not limiting, preferably the message is a SMS message, though it can be any type of electronic message. The smartphone (personal communication device) can send a text message to a preprogrammed number when it receives an alert signal which will register it in the responder queue. The user can then see a button saying/indicating/displaying Accept and Reject on their phone screen. When they hit either one, it sends another text message to the notification escalation system with a message, such as, but not limited to, Accept or Reject. The notification escalation system can then move them to a different queue depending on what response was received. Queue minimums and maximums can be built in. Alternatively, an email, XML, or other electronic file can be sent that has a unique id for the personal communication device.

At F7*b*, the notification escalation system can store the alert recipient information in a system database with characteristics to define this group of recipients as alert responders for a given alert. Multiple alert responder groups/queues can be maintained by the notification escalation system at any given time.

At F7*c*, the notification escalation system can interpret the data from the alert recipient registration message and can begin a timer for this alert recipient group and waits for alert responses from the recipients.

At F7*d*, if an alert response has not been received within the allotted time to respond, the system can execute its escalation process which may include notifications to other parties, systems or the activation of other warning and alerting devices such as sirens, alarms, lights, etc. Once an alert response is received the notification escalation system determines the type of response received and which alert recipient sent the response.

At F7*e*, if the alert response was a rejected type, the notification escalation system can continue to wait for responses and repeats the process beginning at F2*c*.

At F7*f*, for an accepted alert response type, the notification escalation system can determine if the alert responder minimum or limit has been reached. If the limit and/or minimum number of responders has not been reached, the notification escalation system continues to wait for responses and repeats the process beginning at F2*c*.

At F7*g*, once the alert responder limit and/or minimum has been reached, the notification escalation system notifies the other alert recipients who have yet to respond to the alert.

Figure 8:
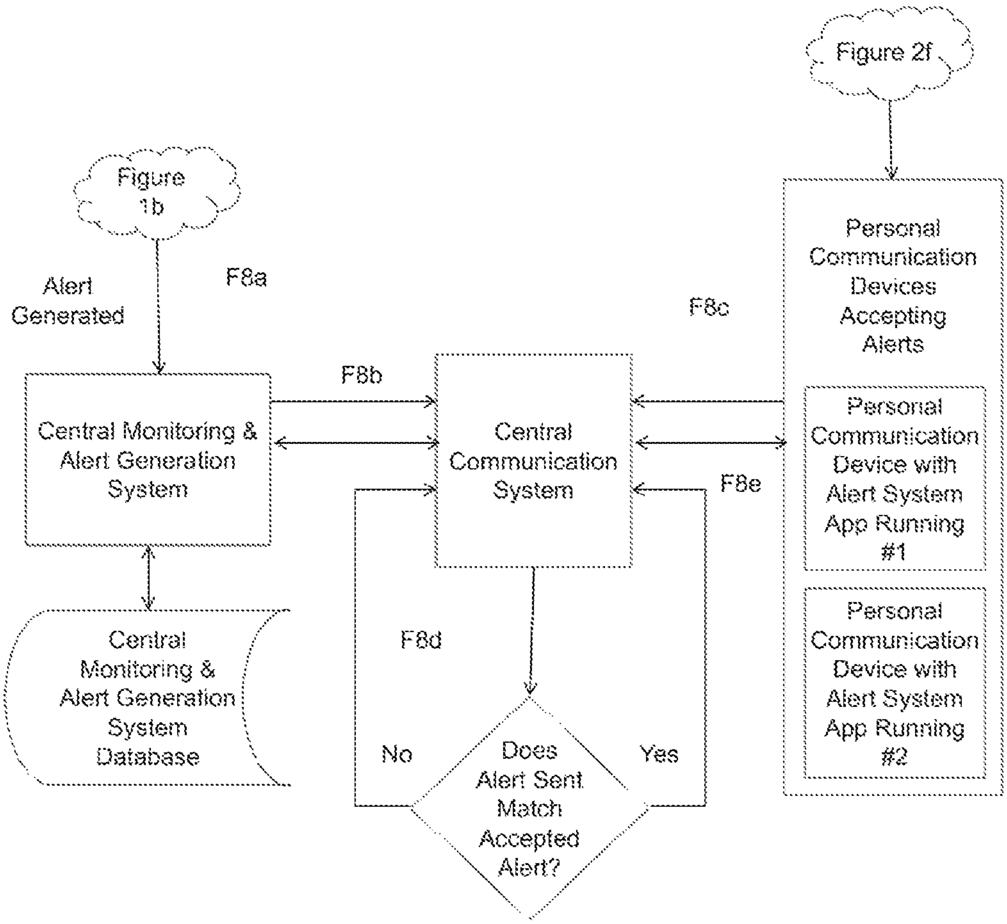
FIG. 8 is a block diagram and process flow illustrating a non-limiting embodiment for direct communication between alert responders and an alert dispatcher in accordance with the present disclosure.

FIG. 8 shows a non-limiting process for Alert Responders to be put in direct communication with the alert dispatcher at the central monitoring and alert generation system.

At F8*a*, which preferably continues from F1*b* of FIG. 1, when an alert has been generated by a central monitoring & alert generation system.

At F8*b*, the central monitoring workstation that generated the alert can preferably register its ID and details of the alert with the central communication system. Registration of the workstation's ID can include, but is not limited to, providing a device ID, serial number, IP address, MAC address, and/or other information to identify that specific workstation. Details of the alert can include, but are not limited to, the alert type/code, alert ID, location sent to, date and/or time sent. The central communication system preferably waits for an alert responder acceptance.

At F8*c*, which preferably continues from F2*f* of FIG. 2, after an alert responder accepts a given alert, a signal can be sent to the central communication system indicating acceptance of the alert and providing identifying information about the alert responder and details of the alert responding to. Responder identifying information can include, but is not limited to, information regarding alert responder name, ID number, location, device ID, IP address and/or MAC Address. Details of the alert can include, but are not limited to, the alert type/code, alert ID, location sent to, date and/or time sent.

At F8*d*, the central communication system determines if a given alert responder's acceptance of an alert matches an alert from a given central monitoring workstations' generated alerts. Matching of alerts can be based on any of one or more factors including but not limited to alert type/code, alert ID, location sent to, date and/or time sent. If the alert response doesn't match a given alert, the system preferably continues monitoring.

At F8*e*, if the central communication system determines a given alert responder's acceptance of an alert matches a specific central monitoring workstations' generated alerts, it can send a signal to both the central monitoring workstation and responder's personal communication device to launch a communication session between the workstation and one or more alert responder devices. The communication session can utilize protocols including, but not limited to, voice, text and/or video.

Figure 9:
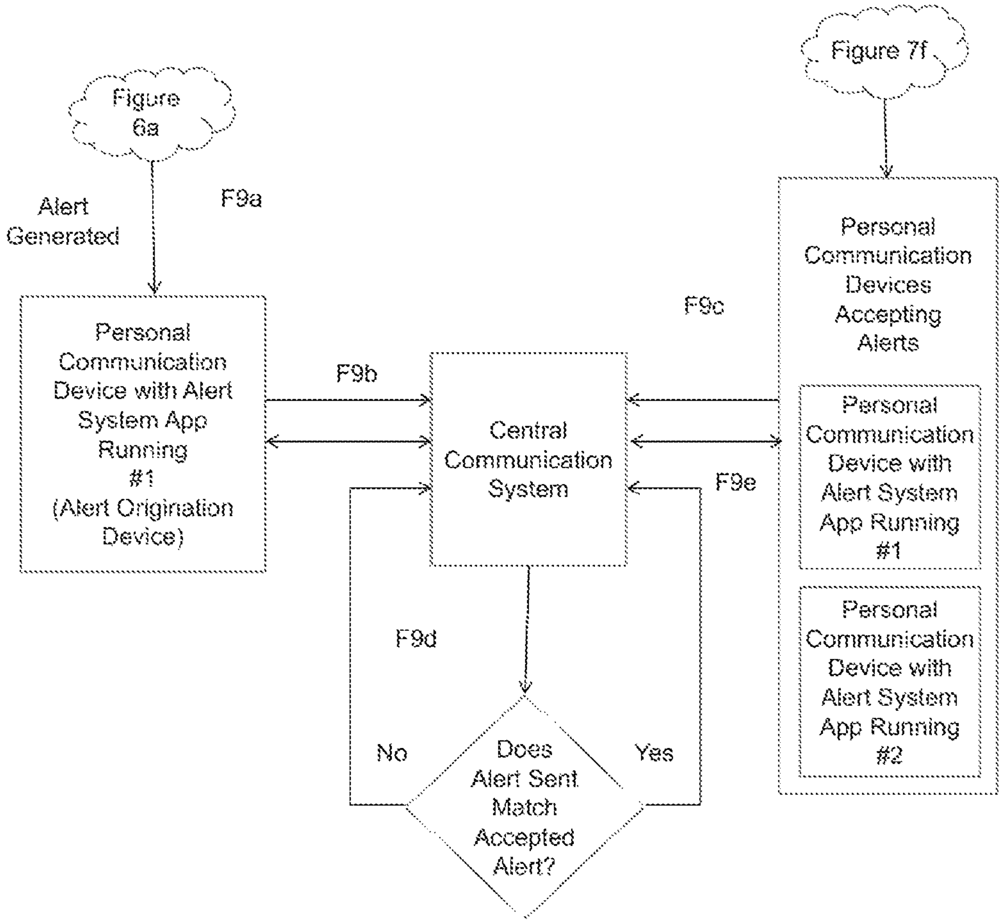
FIG. 9 is a block diagram and process flow illustrating a non-limiting embodiment for direct communication between alert responders and an alert generator in a device to device model.

FIG. 9 shows a non-limiting process for Alert Responders to be put in direct communication with the Alert generator in a device to device model.

At F9*a*, which preferably continues from F6*a* of FIG. 6, when a person having a personal communication device with alert system app installed has generated an alert message signal.

At F9*b*, the personal communication device with alert system app running that generated the alert can preferably register its ID and details of the alert with the central communication system. Registration of the personal communication device's ID can include, but is not limited to, providing a device ID, serial number, IP address, MAC address, and/or other information to identify that specific device. Details of the alert can include, but are not limited to, the alert type/code, alert ID, location sent to, date and/or time sent. The central communication system preferably waits for an alert responder acceptance.

At F9*c*, which preferably continues from F7*f* of FIG. 7, after an alert responder accepts a given alert, a signal can be sent to the central communication system indicating acceptance of the alert and providing identifying information about the alert responder and details of the alert responding to. Responder identifying information can include, but is not limited to, information regarding alert responder name, ID number, location, device ID, IP address and/or MAC Address. Details of the alert can include, but are not limited to, the alert type/code, alert ID, location sent to, date and/or time sent.

At F9*d*, the central communication system determines if a given alert responder's acceptance of an alert matches an alert from a given personal communication devices' generated alerts. Matching of alerts can be based on any of one or more factors including, but not limited to, alert type/code, alert ID, location sent to, date and/or time sent. If the alert response doesn't match a given alert, the system preferably continues monitoring.

At F9*e*, if the central communication system determines a given alert responder's acceptance of an alert matches a specific personal communication devices' generated alerts, it can send a signal to both the alert generating personal communication device and responder's personal communication device to launch a communication session between the alert generating personal communication device and one or more alert responder devices. The communication session can utilize protocols including, but not limited to, voice, text and/or video.

The system that performs the above described functions and steps can include several components including, but not necessarily limited to, the one or more of the following:

1. One or more Wireless Radio, Sound and/or Light-based Beacon(s)
2. One or more personal communication device(s)
3. One or more alert broadcasting, receiving and display device(s)
4. Central Monitoring & Alert Generation System
5. Central Monitoring & Alert Generation System Database
6. Personal Communication Device Alert Application "App"
7. Personal Communication Device Alert Application "App" Database
8. Notification Escalation System
9. Notification Escalation System Database
10. Location Interface System
11. Device Location Database
12. A public or private computer network to connect or communicate the beacons, personal communication devices, alert broadcasting, receiving and display devices, central monitoring & alert generation system, personal communication device alert application, notification escalation system and location interface system.

The various components can be in electrical (wired) and/or wireless communication with each other.

The ability to electronically notify persons of a need that is time sensitive and requires response from a person in close enough proximity to the need will provide significant health, safety, administrative and financial benefits incident to persons and/or organizations where the ability to alert persons capable of providing assistance to a person in need at the time of need and in enough time to meet a minimum time to respond are necessary and vital to operation. Without limitation, these can include the following benefits:

1. Provide persons and organizations the ability to identify a person in need and alert those capable of responding to the persons needs at the time of the need
2. Provide persons and organizations the ability to respond to persons needs within specified time frame.
3. Provide persons and organizations the ability to summon assistance at their current location through manual or automated means.
4. Provide persons and organizations the ability to escalate notifications of needs when those needs are not being responded to in sufficient time.

Below are a couple non-limiting examples of how the above described novel system and method can be implemented in real world situations.

Non-Limiting AED Example

Applying the described system and method to an automated external defibrillator ("AED") scenario as a non-limiting example, each physical AED device can get a small computer that can be set to receive an alarm signal and then broadcast its own alarm signal. When the police or other dispatch/operator receives the call that someone has had a heart attack, the system can determine which AED devices are in the area of the person needed medical attention and then send an alarm signal to the small computer(s) associated with or on the relevant AED device(s) (or the computer can be stored in the same cabinet with the AED device). That or those computer(s) would in turn broadcast the alert signal which can be analogized to an audible alarm. However, the broadcasted audible alarm ("alert signal") can be a Bluetooth signal broadcast that has encoding as to the nature of the alarm, and possibly information on where the AED is needed. Potential responders pre-register to receive any alert at a given location by downloading an App on their smartphone that can be constantly scanning for the Bluetooth signal broadcast when the App is running. When the App finds a signal being broadcasted, it decodes the data and displays the alert information on the person's phone or other electronic device (i.e. tablet, smartwatch, smart wrist band, etc.). In this manner, the responder registration and management is completely decentralized. Each responder only needs to install the App a single time and the user can customize the installed App, such as for the things like availability to respond, different alarm types to receive alert(s) for, etc.

With the above AED scenario, there are instances where the AED device may be a mobile unit, perhaps located in an Ambulance, Fire Truck or responders vehicle and therefore not in the same location at all times and potentially from day to day. One or more beacons can be provided within the Ambulance, Fire Truck, responder vehicle or other storage location. The beacon can send a signal to identify the current location of the device so that the system can broadcast a location. This beacon may use technologies including but not limited to GPS, WiFi location, Cellular Tower triangulation or similar technology. When a beacon is used, the location identification beacon can be installed or provided in each AED storage location. The beacon can be fixed in the mobile location/vehicle and it can broadcast static information including the location ID, name, address, coordinates or other location identifier. When an AED device with computer system is brought into the Ambulance, Fire Truck, responder vehicle or other storage location, the software running on AED computer picks up the beacon signal containing the location information and stores it on the computer. Subsequently, when an alarm signal is activated the software on the computer dynamically uses that location information to generate an alert signal inclusive of the location information. Having the location information included helps to reduce response times because the responder can see the exact location of the person who needs help from the information displayed on his or her smartphone. The beacon can also be integrated into the computer system or function as a wireless solution.

Non-Limiting Hospitality Setting

Applying the described system and method to a hospitality setting can involve security, front-desk and/or concierge staff at a hotel or resort using a centralized monitoring system. The staff may be monitoring security cameras or receive requests from guests and need to summon other staff to assist those guests in need. With the described system, the central monitoring system person can simply press a button that tells the program on a computer near the person in need to broadcast an alert signal via Bluetooth. All of the staff or relevant staff at the hotel or resort can carry phones, smartwatches or similar electronic devices with the App installed. Staff that is in close enough proximity to receive the Bluetooth signal on their electronic device will electronically receive the alert and be able to respond. No database of staff locations and availability are needed. If the staff member is close enough to the location of the need at the time of the need, they will receive the alert through the App running on the smart phone.

By controlling the power level of the alert signal, the system can control where the alert is sent and thus who can possibly receive the alert. For example, the alert signal can be broadcast at a power level of 3 decibels in an area where potential responders may be stationed 1000 feet from the person in need, while it may be configured to broadcast at a power level of −9 decibels in instances where the responders are located within 250 feet of the person in need. Other filters can be provided on the App to allow a responder to only receive certain types of alerts. As non-limiting examples, a bartender may receive alerts for drink orders while the security personnel may receive an alert of a fight between guests, or maintenance staff may receive an alert for a broken piece of equipment.

The system and method described herein can also work on a phone to phone scenario, such as, but not limited to, where a hotel guest wants to directly request items or services, or in the case of a sporting event, where a spectator wants to request concessions (beer, soda, popcorn, hot dogs, peanuts, or even souvenirs) from staff walking around the sporting venue. The hotel guest or sporting spectator can press one of a series of buttons (organized as a menu for example) on the phone App that broadcasts a signal requesting a specific item or service and option. Other staff members with the App installed on their phone in the area can receive the alert and can go assist the guest or spectator. The system can also be updated where a responder indicates that he or she will fulfill the guest's/spectator's request to prevent multiple people attending to the request. Thus, the responders can receive a second signal informing them when one of the responders has indicated that he or she will handle the requests.

Embodiments of the present invention may be operational with numerous other general purpose or special purpose computing system environments or configurations. Examples of well-known computing systems, environments, and/or configurations that may be suitable for use with embodiments of the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

Embodiments of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal number of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosed embodiments have been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An electronic method for alerting one or more responders of a need for their assistance based on a first alert originated by an electronic central monitoring and alert generations system, said method comprising the steps of:

a. electronically generating a first electronic alert signal by a central monitoring and alert generation system;

b. electronically sending the first electronic alert signal by the central monitoring and alert generation system to one or more fixed alert, broadcasting and display devices in proximity to a location where assistance is needed; and c. electronically broadcasting an electronic alert message by the one or more fixed alert, broadcasting and display devices for receipt by one or more personal communication devices associated with one or more responders who are located within a preconfigured or predefined broadcast range or zone for the electronic alert message;

wherein the sending of the first electronic alert signal in step b and the electronic broadcasting of the electronic alert message in step c. are performed prior to any electronic communication or electronic contact between the one or more personal communication devices and the one or more fixed alert, broadcasting and display devices or the central monitoring and alert generation system concerning a current location of the one or more personal communication devices.

2. The electronic method of claim 1 wherein the preconfigured broadcast range is determined by the step of electronically determining a configured alert radius for the generated first electronic alert message.

3. The electronic method of claim 1 wherein proximity to the location where assistance is needed is determined by the step of electronically determining a configured alert radius for the generated first electronic alert signal.

4. The electronic method for alerting of claim 1 further comprising the step of displaying text on a screen of each personal communication device who received the electronic first alert message inquiring whether the one or more responders accept or reject a call for assistance contained in the electronic alert message.

5. The electronic method for alerting of claim 4 further comprising the step of receiving by the central monitoring and alert generation system a signal for each responder of the one or more responders who either electronically accepts or electronically rejects the call for assistance using their personal communication device.

6. The electronic method for alerting of claim 5 further comprising the step of electronically informing a notification escalation system each time a responder electronically accepts or rejects a call for assistance from a received electronic alert message.

7. The electronic method for alerting of claim 2 further comprising the step of continuing to broadcast the electronic alert message by the one or more fixed alert, broadcasting, receiving and display devices for a predetermined period of time or until certain conditions have been met.

8. The electronic method for alerting of claim 1 further comprising the step of continuing to electronically send the first alert signal by the central monitoring and alert generation system for a predetermined period of time or until certain conditions have been met.

9. The electronic method for alerting of claim 7 wherein the predetermined period of time is automatically chosen by the one or more fixed alert, broadcasting, receiving and display devices based on a type of event requiring assistance.

10. The electronic method for alerting of claim 8 wherein the predetermined period of time is automatically chosen by the central monitoring and alert generation system based on a type of event requiring assistance.

11. The electronic method for alerting of claim 8 wherein the certain conditions comprise electronically informing the central monitoring and alert generation system that a responder has accepted to provide assistance or that an individual needing assistance has received assistance or no longer needs assistance.

12. The electronic method for alerting of claim 7 wherein the certain conditions comprise electronically informing the one or more alert, broadcasting, receiving and display devices that a responder has accepted to provide assistance or that an individual needing assistance has received assistance or no longer needs assistance.

13. An electronic method for alerting one or more responders of a need for their assistance based on a first alert originated by an electronic central monitoring and alert generations system, said method comprising the steps of:

a. electronically generating a first electronic alert signal by a central monitoring and alert generation system;

b. electronically sending the first electronic alert signal by the central monitoring and alert generation system to one or more fixed alert, broadcasting and display devices in proximity to a location where assistance is needed;

c. electronically broadcasting an electronic alert message by the one or more fixed alert, broadcasting and display devices for receipt by one or more personal communication devices associated with one or more responders who are located within a preconfigured or predefined broadcast range or zone for the electronic alert message; and d. continuing to broadcast the electronic alert message by the one or more fixed alert, broadcasting, receiving and display devices for a predetermined period of time or until certain conditions have been met;

wherein the sending of the first electronic alert signal in step b and at least an initial electronic broadcasting of the electronic alert message in step c. are performed prior to any electronic communication or electronic contact between the one or more personal communication devices and the one or more fixed alert, broadcasting and display devices or the central monitoring and alert generation system concerning a current location of the one or more personal communication devices.

14. The electronic method for alerting of claim 13 wherein the predetermined period of time is automatically chosen by the one or more fixed alert, broadcasting, receiving and display devices based on a type of event requiring assistance.

15. The electronic method for alerting of claim 13 wherein the certain conditions comprise electronically informing the one or more alert, broadcasting, receiving and display devices that a responder has accepted to provide assistance or that an individual needing assistance has received assistance or no longer needs assistance.

16. An electronic method for alerting one or more responders of a need for their assistance based on a first alert originated by an electronic central monitoring and alert generations system, said method comprising the steps of:

a. electronically generating a first electronic alert signal by a central monitoring and alert generation system;

b. electronically sending the first electronic alert signal by the central monitoring and alert generation system to one or more fixed alert, broadcasting and display devices in proximity to a location where assistance is needed;

c. electronically broadcasting an electronic alert message by the one or more fixed alert, broadcasting and display devices for receipt by one or more personal communication devices associated with one or more responders who are located within a preconfigured or predefined broadcast range or zone for the electronic alert message; and d. continuing to electronically send the first alert signal by the central monitoring and alert generation system for a predetermined period of time or until certain conditions have been met;

wherein at least an initial sending of the first electronic alert signal in step b and the electronic broadcasting of the electronic alert message in step c. are performed prior to any electronic communication or electronic contact between the one or more personal communication devices and the one or more fixed alert, broadcasting and display devices or the central monitoring and alert generation system concerning a current location of the one or more personal communication devices.

17. The electronic method for alerting of claim 16 wherein the predetermined period of time is automatically chosen by the central monitoring and alert generation system based on a type of event requiring assistance.

18. The electronic method for alerting of claim 16 wherein the certain conditions comprise electronically informing the central monitoring and alert generation system that a responder has accepted to provide assistance or that an individual needing assistance has received assistance or no longer needs assistance.

* * * * *